Nov. 13, 1962    H. SACHS    3,063,705
UNIVERSAL CARBURETOR AND CHOKE REPAIR TOOL
Filed Oct. 14, 1960    3 Sheets-Sheet 1
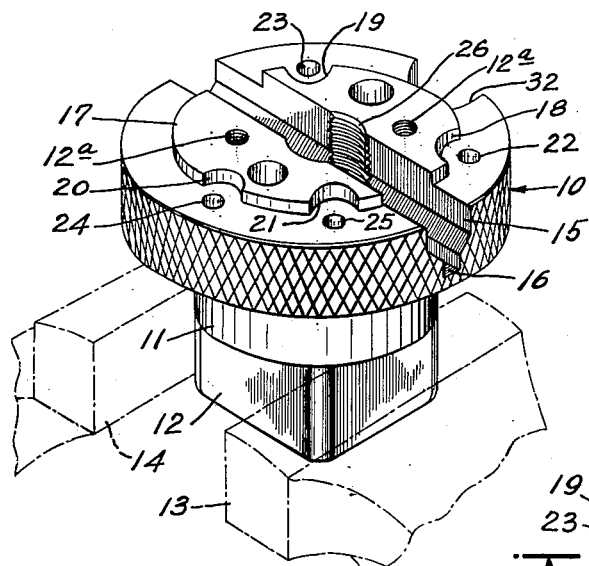
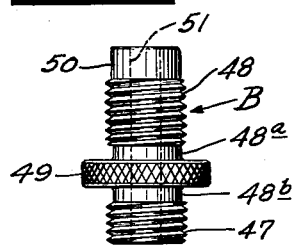
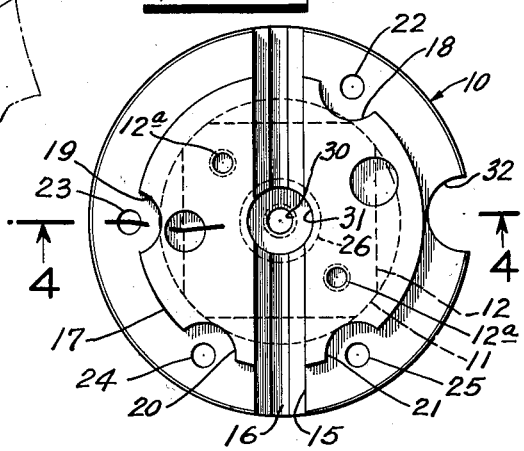
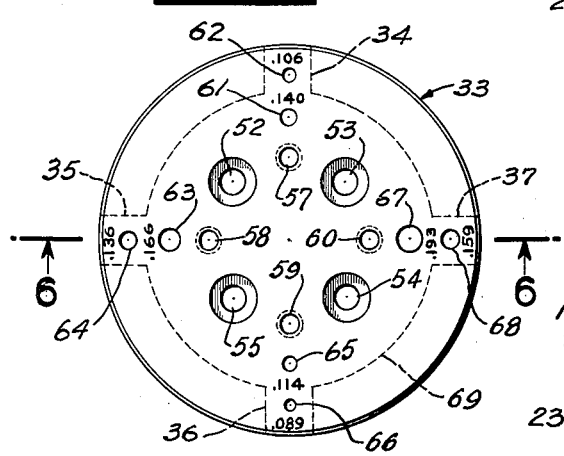
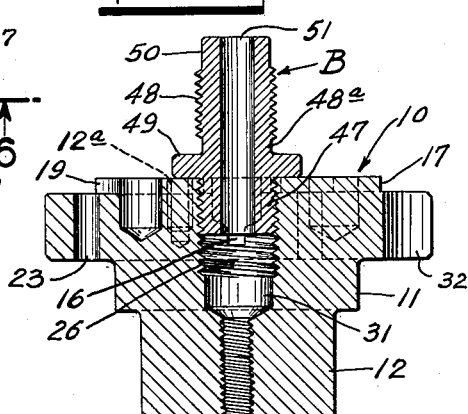
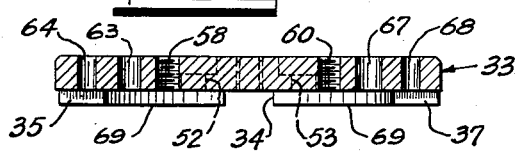
INVENTOR.
HERBERT SACHS
BY
H. G. Manning
ATTORNEY

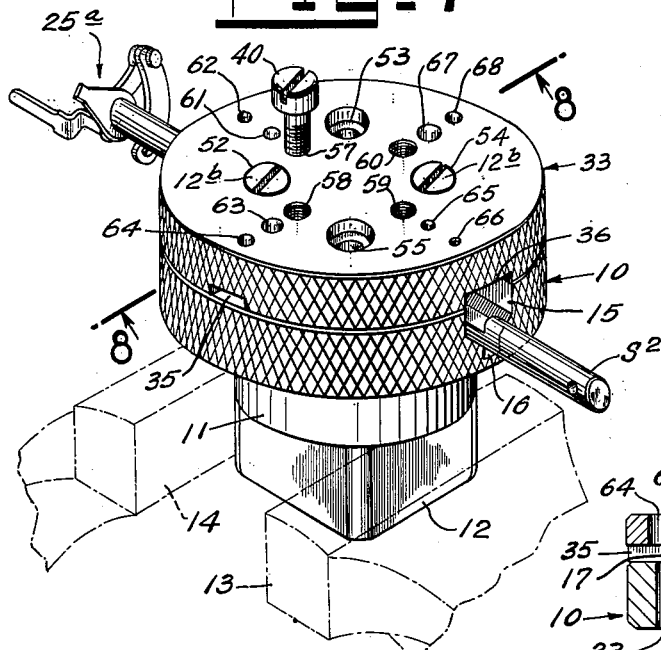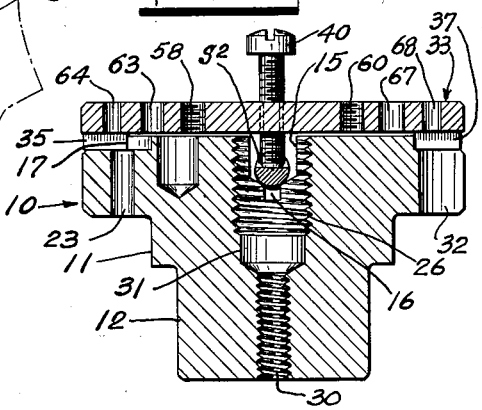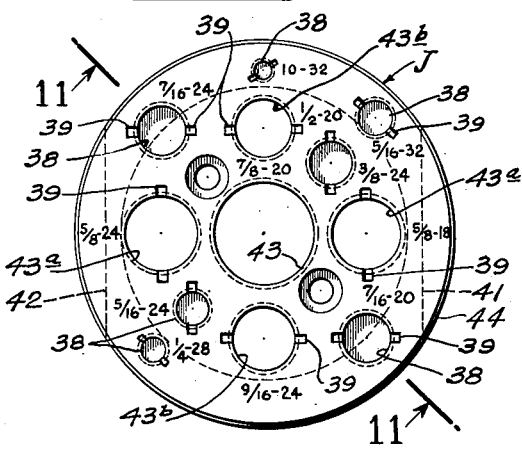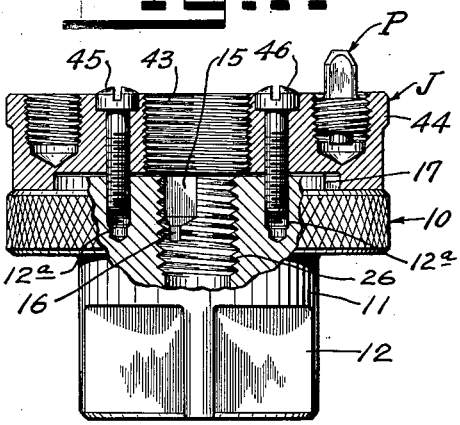

Nov. 13, 1962 H. SACHS 3,063,705
UNIVERSAL CARBURETOR AND CHOKE REPAIR TOOL
Filed Oct. 14, 1960 3 Sheets-Sheet 3
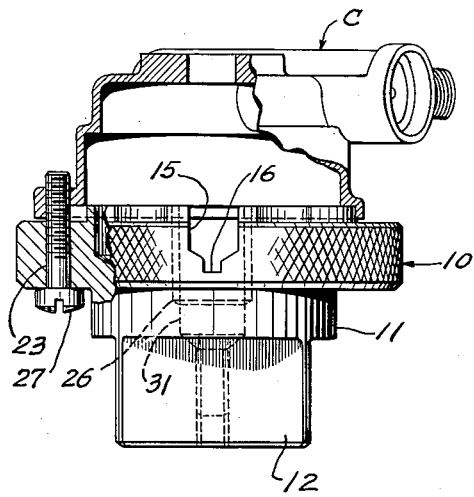
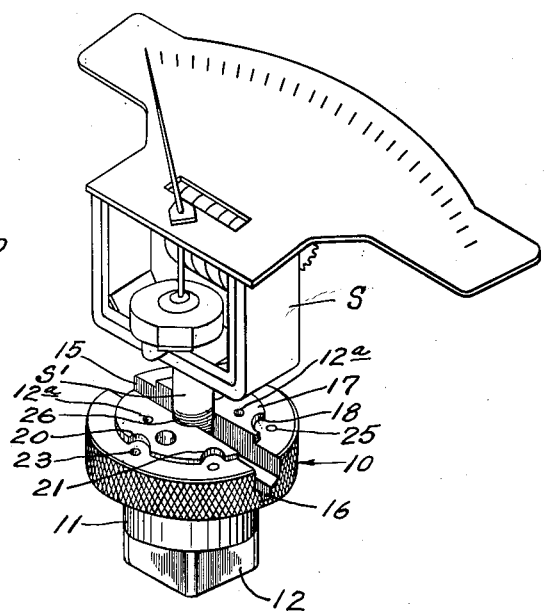
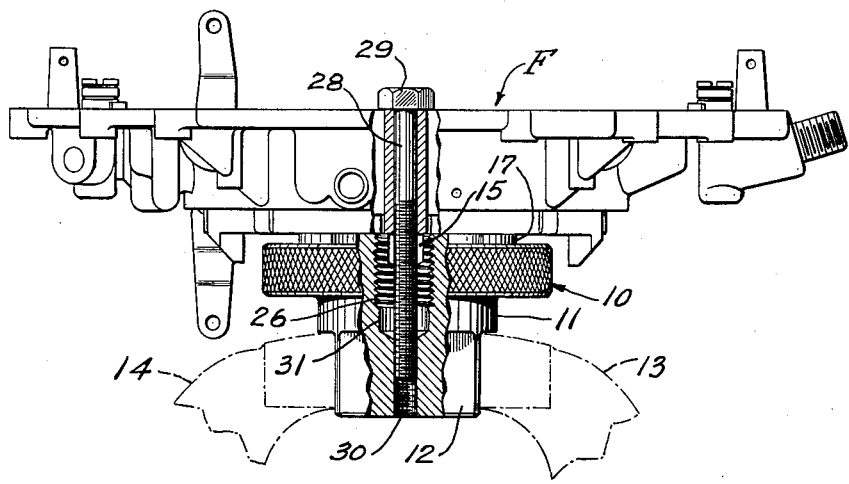
INVENTOR.
HERBERT SACHS
BY
*H. G. Manning*
ATTORNEY

United States Patent Office 3,063,705
Patented Nov. 13, 1962

3,063,705
UNIVERSAL CARBURETOR AND CHOKE
REPAIR TOOL
Herbert Sachs, Yonkers, N.Y., assignor to Draf Tool Company, Inc., White Plains, N.Y., a corporation of New York
Filed Oct. 14, 1960, Ser. No. 62,686
1 Claim. (Cl. 269—9)

This invention relates to tools, and more particularly to a tool which may be used to facilitate and simplify the servicing of all types of carburetors, choke housings, speedometers, alternators, etc.

A further object is to provide a tool or fixture of the above nature which will serve as a holding fixture for cleaning, burnishing and repairing choke housings, which will also serve as a holding fixture for the straightening, drilling and tapping of throttle and choke shafts, as well as serving as a holding fixture for speedometers and alternators to facilitate the repair of same.

One object of the present invention is to provide a tool of the above nature, having a bushing adapter which will securely hold float chamber carburetor covers in position for repairing operations thereon.

A further object is to provide a tool of the above nature which will be simple in construction, inexpensive to manufacture, easy to install and manipulate, compact, ornamental in appearance, and very efficient and durable in use.

With these and other objects in view, there have been illustrated on the accompanying drawings, several forms in which the invention may conveniently be embodied in practice.

In the drawings:

FIG. 1 represents a top perspective view of the main universal fixure as it appears when clamped between the two jaws of a vise, shown in dot and dash lines.

FIG. 2 is a side view of the bushing adapter used with the universal tool for holding various parts thereon in position for repair.

FIG. 3 is a top plan view of the universal fixture.

FIG. 4 is a cross-sectional view of the same, taken along the line 4—4 of FIG. 3, looking in the direction of the arrows, with a bushing adaptor shown screwed into the fixture in operating position for holding a tapped part to be repaired.

FIG. 5 is a top plan view of the drill and tap pilot plate which is used in conjunction with the main universal fixture.

FIG. 6 is a cross-sectional view of the same, taken along the line 6—6 of FIG. 5.

FIG. 7 is a perspective view of the universal fixture and the pilot plate as they appear when secured together by screws, and showing a horizontal shaft clamped in the tapered cross slot of the universal fixture in position for drilling or tapping holes in said shaft.

FIG. 8 is a cross-sectional view of the same, taken along the line 8—8 of FIG. 7.

FIG. 9 is a top plan view of the jet plate, which may be used instead of the drill and tap pilot shown in FIG. 5, for holding a jet carburetor part upon the universal fixture in position for chasing the threaded section thereof.

FIG. 10 is a side view of the jet plate, shown partly in section, as it appears when secured within the jaws of a vise.

FIG. 11 is a cross-sectional view, taken along the line 11—11 of FIG. 9, showing the jet plate secured by screws to the universal fixture.

FIG. 12 is a side view of a choke housing shown partly in section, as it appears when assembled in the universal fixture in position to be repaired.

FIG. 13 is a perspective view of a speedometer, as it appears when detachably secured to the universal fixture in position for chasing the threads thereon.

FIG. 14 is a side view, partly in section, of a carburetor float chamber, as it appears when attached by a vertical elongated screw to the universal fixture in position for permitting repairs to be made thereon.

The carburetor is a vital component of an automobile and must be kept in good condition in order to obtain the maximum service therefrom. The manufacturers of carburetors have recognized this important fact, and have furnished easy-to-follow instruction sheets and other aids to the mechanics in the service departments of automotive dealers.

The universal fixture of the present invention is another step forward to facilitate the servicing of carburetor parts, easily, accurately, and more profitably.

The universal tool or fixture herein disclosed with its bushing adapter is especially suitable for securely holding "Rochester and Carter" four barrel carburetor chamber covers perfectly level, so as to permit the mechanic to repair them faster and more accurately, while standing in an upright position.

It is also understood that sticking and binding choke piston conditions must be corrected if proper carburetor performance is to be retained. The universal fixture of the present invention is especially adapted for this important purpose.

When choke housings become distorted, it is difficult to install the automatic choke cover without breaking or damaging it. By means of the present invention, a choke housing may be placed on the central mounting gauge of the universal fixture and easily restored to its proper shape. This gauge also permits the amount of distortion to be accurately determined and corrected.

When servicing shafts of speedometers, carburetors, etc., the small delicate screws are easily broken, and the use of the present pilot plate mounted on the universal fixture permits the operator to accurately and easily drill and tap said shafts. Moreover, a bent shaft which would otherwise interfere with proper carburetor performance may readily be straightened while secured in the horizontal tapered cross-slot of the universal fixture.

Moreover, cumbersome and hard-to-hold speedometers can be securely held in the universal fixture for servicing, testing, setbacks, and head repairs. The central threaded hole of the universal fixture also acts as a thread chaser when the speedometer is screwed into said hole.

The universal drill tap pilot plate provides a plurality of pairs of different sized tap pilot and drill pilot holes arranged around the circumference thereof which may be used upon various sizes of shafts. The shaft to be drilled is placed in horizontal position in the universal fixture cross slot and the pilot plate will be rotated until the proper drill and tap holes are selected. The pilot plate will be secured tightly on the universal fixture by means of holding screws, so that the repair operation may then be easily performed.

Referring now to the drawings, in which like reference numerals denote corresponding parts throughout the several views, the numeral 10 indicates a knurled cylindrical universal fixture having a cylindrical shoulder 11 of smaller diameter integral therewith. The universal fixture 10 is also provided with a square base 12 which may be tightly clamped in four different positions within the jaws 13 and 14 of a vise, shown in dotted lines, one such position being illustrated in FIG. 1.

Provision is also made in the universal fixture 10 of a horizontal tapered cross slot 15, the bottom of which is provided with a horizontal keyway 16, as clearly shown in FIGS. 1, 3, 8, and 12 of the drawing. The top of the universal fixture 10 is provided with a central raised circular gauge area 17 of reduced diameter, as clearly shown in FIGS. 1, 3 and 4, said gauge area 17 having four equally spaced edge circular recesses or cutouts 18, 19, 20, 21, as clearly shown in FIG. 3.

Provision is also made of four mounting holes 22, 23, 24, 25, concentric with said cutouts 18, 19, 20, 21, which are adapted to receive choke attaching bolts 27, inserted from below in said holes (see FIG. 12).

Provision is also made in the universal fixture 10 of a large central threaded recess 26 for selectively receiving an invertable bushing adapter B or the depending threaded section S1 of a speedometer S (see FIGS. 4 and 13 respectively).

The bushing adapter B (FIGS. 2 and 4) has a short threaded section 47 and a longer threaded section 48 between which are a pair of reduced necks 48a and 48b, and an enlarged knurled flange 49. The top of the adapter B also has an end clearance cap 50, and said adapter has a central drilled hole 51.

The universal fixture 10 also has a pair of screw holes 12a (FIGS. 1 and 3) which are adapted to receive a pair of screws 12b for securing a drill and tap pilot plate 33 to said universal fixture 10 (FIG. 7) in order to repair injured carburetor and choke shafts.

An elongated vertical bolt 28 shown in FIG. 14, which is smaller in diameter than the threaded recess 26, serves to hold a carburetor float chamber F securely upon the universal fixture 10, said bolt having a top head 29, and having bottom threads engaged in a small tapped hole 30 in the base of the universal fixture 10 (FIG. 8). The numeral 31 (FIG. 4) indicates a clearance socket at the bottom of the threaded central hole 26.

The numeral 32 indicates a cutout in the edge of the cylindrical master fixture 10 which is adapted to clear the stove pipe of the choke housing C, while the latter is being repaired. The letter $S_2$ indicates the shaft of a choke housing, which shaft is clamped on the shoulders of the keyway 16 while being serviced, said shaft $S_2$ having a choke shaft assembly 25a at one end, outside the fixture 10.

A drill and tap pilot plate 33 is also provided, having four bottom radial slots 34, 35, 36, 37, and a central bottom recess 69, as clearly shown in FIGS. 5 and 6 of the drawing.

The drill and tap pilot plate 33 is provided with four bolt holes 52, 53, 54, 55 (FIG. 5), which may be selectively aligned with the holes 12a of the universal fixture 10 to receive the screws 12b in four different adjusted positions of said plate 33. The pilot plate 33 is also provided with four intermediate shaft engaging screw holes 57, 58, 59, 60 (as shown in FIGS. 5, 6 and 7), and said pilot plate 33 also has a series of pairs of drill and tap pilot holes 61, 62; 63, 64; 65, 66; 67, 68 respectively.

FIGS. 9 and 10 illustrate a knurled jet plate J having a pair of bottom parallel sides 41, 42, which may be held either by the jaws 13 and 14 of a vise, or secured by screws 45, 46 to hold the jet plate J on the universal fixture 10, as clearly shown in FIG. 11.

The jet plate J is provided with a series of outer tapped holes 38 of various sizes having cross slots 39 at the tops thereof, which holes 38 selectively receive threaded carburetor jets P (FIG. 11) and serve to hold tools for chasing the threads on said jets.

The jet plate J (FIG. 11) is also provided with a relatively large central tapped hole 43, a pair of smaller opposed tapped holes 43a, and another pair of opposed intermediate size tapped holes 43b, for the same purpose as said holes 38. The sides 41, 42 of the jet plate are adapted to be clamped by the jaws 13, 14 of a vise whenever desired, instead of attaching the jet plate to the universal fixture 10 (see FIG. 10). The jet plate J also has a top flange 44 which is knurled, as shown in FIG. 10.

Operation

In the operation of the invention for repairing a choke shaft $S_2$, the latter will be placed in horizontal position in the tapered cross slot 15 of the universal fixture 10, and the pilot plate 33 will be rotated until the proper sized drill or tap holes are selected. The pilot plate 33 will then be secured tightly on the universal fixture 10 by the screws 12b, and the drilling and tapping operations may then be performed upon the shaft S2.

In the operation of the jet plate J, the part P to be chased will be located in its proper sized hole 38, 43, 43a, 43b, and turned as far as it will go to restore the threads thereof.

One advantage of the present invention is that it permits drilling and tapping of holes in various sizes of carburetors, throttle and choke shafts which have had small screws broken during the loosening or removing of said shafts.

Another advantage of the present invention is that it permits various sizes of carburetor parts to be chased after the threads have been worn, damaged or coated, thus saving the necessity of buying new parts and waiting for new parts to be delivered.

While there have been disclosed in this specification, several forms in which the invention may be embodied, it is to be understood that these forms are shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a tool for holding tapped carburetor and choke parts to facilitate the repair thereof, a fixture having a cylindrical upper section and a square base adapted to be clamped between the jaws of a vise, said fixture having an upper central threaded recess, and an invertible adapter bushing having short and long threaded sections on its opposite ends shaped to selectively fit said threaded recess, said bushing serving to receive said tapped carburetor and choke parts detachably on the uppermost threaded end thereof.

References Cited in the file of this patent
UNITED STATES PATENTS

| | | |
|---|---|---|
| 672,217 | Noyes | Apr. 16, 1901 |
| 1,721,111 | Graf | July 16, 1929 |
| 2,451,035 | Marsilius | Oct. 12, 1948 |
| 2,932,995 | Durfee | Apr. 19, 1960 |

FOREIGN PATENTS

| | | |
|---|---|---|
| 942,485 | Germany | May 3, 1956 |